(12) United States Patent  
Pichot

(10) Patent No.: US 9,377,330 B2
(45) Date of Patent: Jun. 28, 2016

(54) METHOD FOR MONITORING A TRANSMITTER AND CORRESPONDING TRANSMITTER

(71) Applicant: KROHNE Messtechnik GmbH, Duisburg (DE)

(72) Inventor: Vincent Pichot, Romans sur Isere (FR)

(73) Assignee: KROHNE Messtechnik GmbH, Duisburg (DE)

( * ) Notice: Subject to any disclaimer, the term of this patent is extended or adjusted under 35 U.S.C. 154(b) by 594 days.

(21) Appl. No.: 13/680,431

(22) Filed: Nov. 19, 2012

(65) Prior Publication Data

US 2013/0174633 A1   Jul. 11, 2013

(30) Foreign Application Priority Data

Jan. 9, 2012   (DE) .......................... 10 2012 000 187
Sep. 11, 2012  (EP) ..................................... 12066366

(51) Int. Cl.
*G01D 18/00* (2006.01)
*H04B 17/17* (2015.01)
*G05B 23/02* (2006.01)
*G06F 11/07* (2006.01)

(52) U.S. Cl.
CPC .............. *G01D 18/00* (2013.01); *H04B 17/17* (2015.01); *G05B 23/0291* (2013.01); *G05B 2219/14114* (2013.01); *G06F 11/07* (2013.01)

(58) Field of Classification Search
None
See application file for complete search history.

(56) References Cited

U.S. PATENT DOCUMENTS

| | | | |
|---|---|---|---|
| 6,017,143 A | 1/2000 | Eryurek et al. | |
| 7,139,683 B2 | 11/2006 | Pfündlin et al. | |
| 7,539,600 B2 | 5/2009 | Pfündlin et al. | |
| 8,180,466 B2 | 5/2012 | Longsdorf et al. | |
| 2005/0189017 A1 | 9/2005 | Eryurek | |
| 2008/0211660 A1 | 9/2008 | Takeuchi | |
| 2010/0045453 A1* | 2/2010 | Orr et al. ................... | 340/506 |

* cited by examiner

*Primary Examiner* — Kenneth M Lo
*Assistant Examiner* — Geoffrey Wellman
(74) *Attorney, Agent, or Firm* — David S. Safran

(57) ABSTRACT

A method for monitoring a transmitter that has a measurement unit and a transmission unit which are interconnected to each other in order to transmit signals. There is at least one connecting line for supplying power to the measurement unit which determines a measurement quantity and generates a measurement signal which is dependent on it. The transmission unit receives the measurement signal from the measurement unit, and based on the measurement signal, transfers an output signal to at least one signal transmission element. To provide a method for monitoring a transmitter which allows reliable displaying of an error as easily as possible and the shifting of the transmitter into a secured state, in the case in which the measurement unit detects the presence of an error state, the measurement unit acts on the connecting line.

7 Claims, 2 Drawing Sheets

METHOD FOR MONITORING A TRANSMITTER AND CORRESPONDING TRANSMITTER

BACKGROUND OF THE INVENTION

1. Field of the Invention

The invention relates to a method for monitoring a transmitter. The transmitter comprises at least one measurement unit and one transmission unit. The measurement unit and the transmission unit are interconnected at least for transmission of signals. Furthermore, there is at least one connecting line for supplying power to the measurement unit which is used to determine at least one measurement quantity and to produce a measurement signal which is dependent on it. The transmission unit receives the measurement signal from the measurement unit and is used to transfer an output signal to at least one signal transmission element, based on the measurement signal. The invention also relates to a corresponding transmitter.

2. Description of Related Art

Transmitters—alternative names are transducers or field devices—of the aforementioned type have been known for a long time and are used quite generally to detect the primary sensor signal which originates from a sensor unit or a sensor element and to convert it into a generally standardized signal as an electrical output signal, so that it can be used for example, by a higher-level process monitoring unit or control unit. The term transmitter should not be understood as limiting in any way. The sensor unit can be used especially for measurement of physical or chemical measurement quantities, for example, flow rate, mass flow rate, pressure, temperature, fill level, pH value, etc.

This transmitter can be divided at least into two parts for the general examination: into a measurement unit which is used for the measurement in itself and which makes available a measurement signal which originates from the measurement, and into a transmission unit which receives the measurement signal and transfers it for example, via a field bus to a higher-level unit. One part of the transmitter performs the task of actual measurement and the other part of the transmitter communicates the measurement value which has been obtained in the measurement or optionally the acquired measurement values to other units.

Transmission takes place via any signal transmission element which is, for example, an interface of a field bus or a two-wire connection site or any type of a field bus itself or any communications element or line element for a 4 . . . 20 mA signal, for example. In one example, it is an electrical conductor. It can also be, for example, a wireless radio link.

Depending on the application, transmitters must satisfy different safety requirements. Thus, in particular, possible error sources must be recognized, and optionally, there must be safety measures. For errors, critical regions are, for example, the measurement itself, the signal processing or data processing in the transmitter and also the communication with for example, the units which are at a higher level than the transmitter. In order to satisfy the respective safety requirements, for example, the SIL (Safety Integrity Level) standard which is important especially in process automation, there must be, for example, redundancy or diversity for the transmitters. Redundancy here means a doubled or multiple layouts of safety-relevant components. Diversity means that the hardware components or software programs which are used originate from different manufacturers or are of different type. Both redundant and also diverse configurations are generally complex and/or costly.

For example, the European Patent EP 1 466 308 B1 and corresponding U.S. Pat. Nos. 7,139,683 B2 and 7,539,600 B2 disclose a sensor arrangement with a measurement detector which generates a raw signal, and with an output stage which outputs an output signal. Between the measurement detector and the output stage, transmission and conversion of the raw signal into the output signal take place. An additional monitoring unit generates, from the raw signal, an auxiliary signal and compares it to the output signal in order to signal deviations beyond a predetermined framework. It is disadvantageous that there must be a second unit for processing of the raw signal. At the same time, only the signal path within the transmitter is monitored in this way.

U.S. Pat. No. 6,017,143 describes a transmitter with a measurement unit and an input/output unit for connection to a process loop. Furthermore, there is a microprocessor which is connected to a storage unit. Data and rules which have been taught or input are stored in the storage unit. The microprocessor is designed such that it recognizes and signals errors based on the stored data and the measurement signals.

European Patent Application EP 2 219 013 A1 and corresponding U.S. Patent Application Publication 2010/0211342 A1 disclose a circuit via which it can be checked in a measurement device whether a set measurement current corresponds to a setpoint.

U.S. Patent Application Publication 2005/0189017 A1 discloses a pressure sensor which checks the measurement signals for errors and signals the presence of an error.

A quantity which is relevant for assessing a transmitter with respect to safety is the safe failure fraction (SFF) which indicates how large a portion of the safe error of the altogether possible errors exists. A safe error is an error which is relevant to safety, and which however, either is recognized or transfers the transmitter into a safe state. Therefore, one problem lies in the detection of the presence of an error or an error state. Another problem is the safe communication of the detected error or of the shifting of the transmitter into a safe state as easily as possible.

SUMMARY OF THE INVENTION

Therefore, a primary object of the present invention is to devise a method for monitoring a transmitter, and a corresponding transmitter, which allows reliable display of an error as easily as possible and the shifting of the transmitter into a secured state.

The method in accordance with the invention in which the aforementioned object is achieved is characterized, first of all, essentially by the following steps: In the case in which the measurement unit detects the presence of an error state, the measurement unit acts on the connecting line which is used for supplying power to the measurement unit. In the method in accordance with the invention, classical data communications for displaying of an error is replaced by the power supply being accessed. Monitoring of the electrical energy relative to the required voltage or the current intensity is very popular and conventional in many devices, whether sensors or actuators. Therefore, the invention starts here and uses this to display the error and to shift the transmitter into a secured state in the case of the presence of an error. The measurement unit is connected to the connecting line in one version via the transmission unit and in an alternative configuration is directly connected to the outer region of the transmitter. Therefore, the error is signaled accordingly, first, internally in the transmitter or directly with the vicinity of the transmitter.

By the action of the measurement unit on the connecting line, in one configuration, the transmission unit, and thus, consequently preferably, also the transmitter are shifted into a definable state and/or an error signal is transferred to the transmission unit. The transmission unit is generally an interface of the transmitter to the vicinity.

In the case in which the measurement unit does not detect an error state, that therefore there is no error state, in one configuration, the measurement unit transfers a measurement signal which has been generated as a result of determining the measurement quantity to the transmission unit.

One version for displaying of the error or for the associated shifting of the transmission unit or of the transmitter into a secured state lies in that, via the connecting line, a charging state of the transmitter is influenced such that charging state monitoring detects a charging state error. If the transmitter, for example, has an energy storage device, in one configuration, in the case of an error, it is discharged; this can be detected, for example, by a monitoring of the voltage. Discharging also has the advantage that the stored energy is no longer present so that the transmitter is in a low-energy, and therefore, a safe state.

In one configuration, the measurement unit acts on the connecting line such that an energy value which has been tapped from the measurement unit is outside a definable region. For example, if a certain range is specified for the available voltage, a voltage demand outside this range indicates the presence of an error. The corresponding applies to the electrical current whose demand can, likewise, alternatively be set by the measurement unit. If, for example, the energy demand is increased, the measurement unit takes energy from the transmission unit or the transmitter and forces the transmission unit or the transmitter into a safe, i.e., de-energized or at least low-energy state relative to normal operation.

In one alternative or supplementary configuration, the measurement unit acts on the connecting line such that the connecting line is interrupted. There is a switch for this purpose, for example.

The aforementioned object is achieved according to another teaching of the invention in the initially named, especial safety or safety-relevant transmitter in that the measurement unit is made such that, in the case in which there is an error state, the measurement unit acts on the connecting line for transmission of energy. The measurement unit is made for transmission of the measurement signal which is produced based on the actual measurement with a sensor element to the transmission unit. Furthermore, the measurement unit allows the detection of the presence of an error in the transmitter or in the monitored process or in the hardware environment which is connected to the transmitter. The measurement unit and the transmission unit are connected for the transmission of data and energy, and the connection modalities can also coincide in a connection. In case of an error the measurement unit displays the error and in the error-free state preferably transmits the measured value or the generated measurement signal. For error display the measurement unit acts on the connecting line for transmission of energy.

The measurement unit and the transmission unit of the transmitter in accordance with the invention preferably allow the sending and receiving of electrical signals, data and energy. There can be bidirectional or unidirectional links.

If the transmitter is, for example, a two-wire measurement device, a current characteristic and/or voltage characteristic or a value as is outside the characteristics or values which occur in a normal case is set by the measurement unit at the signal output of the transmission unit, i.e., on the two-wire interface of the signal transmission element, for example, in the case of an error.

In one configuration, the measurement unit is made such that the measurement unit is shifted into a definable state via action on the connecting line and/or an error signal is transferred to the transmission unit. In one configuration, there is at least one switch for opening and closing the connecting line for the action.

The above described configurations of the method in accordance with the invention can also be used in the transmitter in accordance with the invention named here, i.e., the remarks made on the method apply accordingly here. Conversely, the configurations of the transmitter in accordance with the invention can also be used in the method and the remarks also apply accordingly to the implementation in the method in accordance with the invention.

In particular, there are now a host of possibilities for embodying and developing the method in accordance with the invention and the transmitter in accordance with the invention. In this regard reference is made to the following description of exemplary embodiments in conjunction with the accompanying drawings.

DETAILED DESCRIPTION OF THE INVENTION

Figure 1:
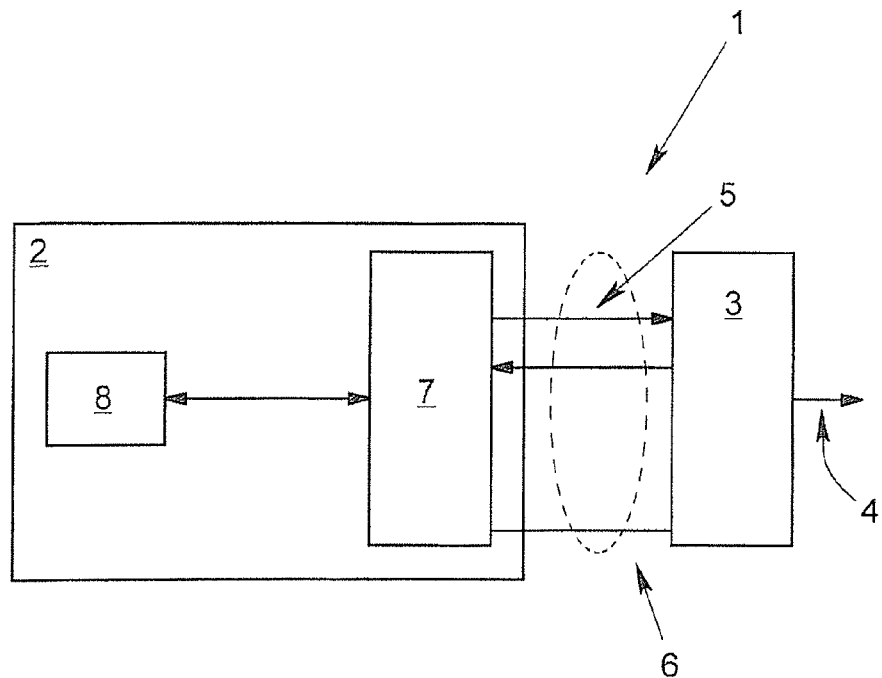
FIG. 1 shows a schematic of a transmitter in accordance with the invention which illustrates essentially the active functional relationships using a block diagram, with a connection to a signal transmission element.
Figure 2:
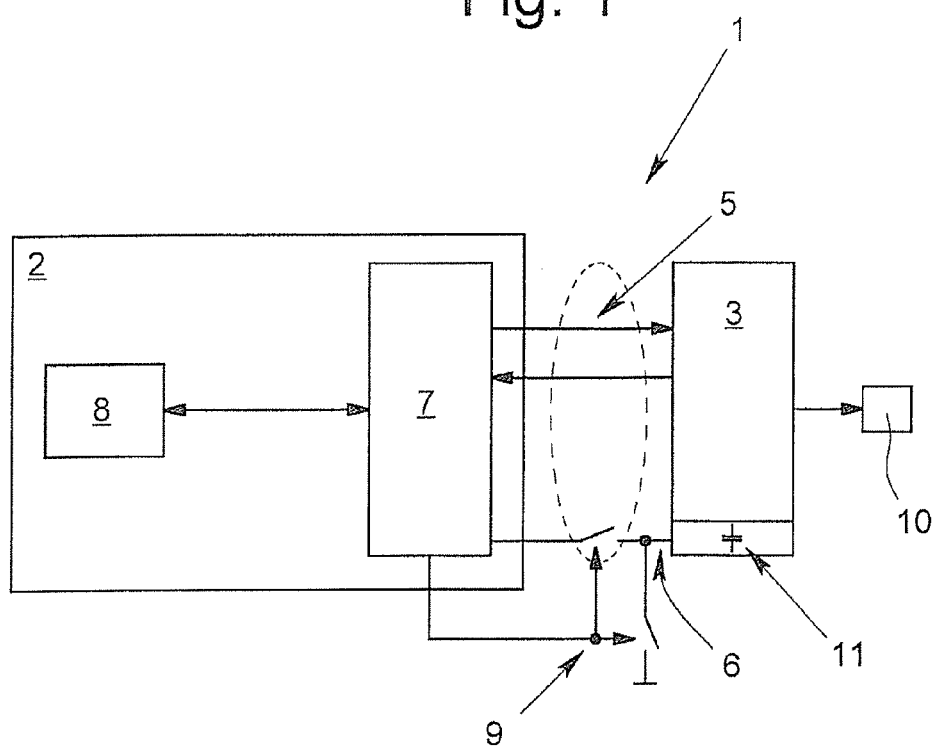
FIG. 2 shows a schematic of another exemplary embodiment of a transmitter in accordance with the invention with an example for the shifting of the transmission unit into a definable state in case of an error.
Figure 3:
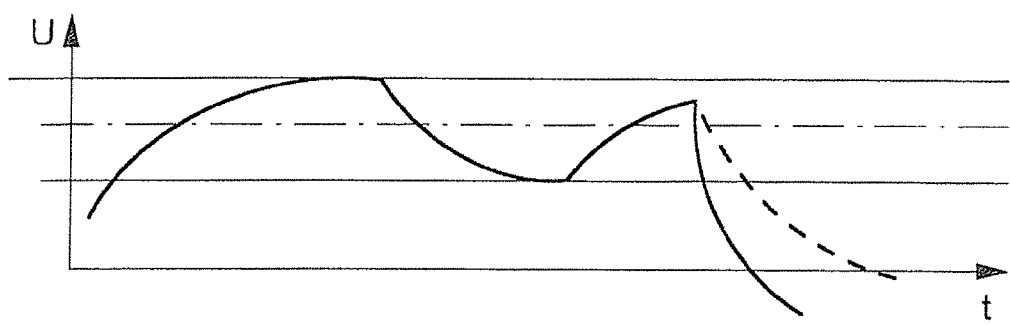
FIG. 3 is a plot of a time characteristic of a voltage signal of a transmission unit of the exemplary embodiment of FIG. 2.

FIGS. 1 & 2 show different exemplary embodiments of a transmitter 1, the figures not being representations in the sense of correct electrical wiring diagrams, but rather indicating the active relationships between the different components of the transmitter 1. The signal characteristic which is shown in FIG. 3, fundamentally, shows the possible characteristics of voltage signals as can occur as a result of using the method in accordance with the invention or in a transmitter in accordance with the invention.

The block diagram of FIG. 1 shows a transmitter 1 in accordance with the invention which has a measurement unit 2 and a transmission unit 3. Proceeding from a measurement of a physical and/or chemical measurement quantity or process quantity, the measurement unit 2 transfers a measurement signal to the transmission unit 3 which transfers the measurement signal in the of an output signal to a signal transmission element 4. Therefore, the transmission unit 3 can also be called a converter which translates or converts the measurement signal into a bus-capable output signal, for example. The signal transmission element 4 is, for example, a part of a field bus or a dual wire for linking, for example, to a higher-level unit which is not shown. Alternatively, it can also be a wireless radio link. The transmission unit 3 has at least one signal input for receiving the measurement signal from the measurement unit 2 and a signal output for outputting of the output signal.

The transmission unit 3 and the measurement unit 2 are connected, on the one hand, via a communications link 5 for transmission of data, and on the other, via a connecting line 6 for supplying power to the measurement unit 2 from the transmission unit 3. Supplying power to the measurement unit 2 takes place in the illustrated example via the transmission unit 3 and is, thus, especially an example of a two-wire measurement device in which the values about the power supply are output.

The measurement unit 2 has a transmitting and receiving unit 7 for signals and a sensor unit 8 for the actual measurement. The measurement unit 2, based on the measurement quantity which is to be measured (for example, flow rate, pressure, fill level, pH value, electrical conductivity, etc.), generates a raw signal which is converted by the transmitting and receiving unit 7 into the measurement signal (current value or voltage value or a digital signal, etc.).

The measurement unit 2 is made such that it detects the presence of an error state in the measurement, in the transmitter 1 itself, or for example, also in the process which is to be monitored. This takes place, for example, in that a secondary measurement quantity is determined and evaluated in addition to the actual measurement quantity, or that it is detected that the determined measurement signal is outside of an allowable range or that the transmitter 1 reads back the measured values which have been transmitted to the signal transmission element 4 and compares them to stored values.

If the measurement unit 2 detects that there is an error state, it signals this via an action on the connecting line 6 which is used for supplying power to the measurement unit 2. In one version, the measurement unit 2 sets an energy demand which is outside a defined normal range. If there is no error, the measurement unit 2 transmits the measurement signal to the transmission unit 3 which outputs a corresponding output signal to the signal transmission element 4.

FIG. 2 shows a version which allows the measurement unit 2 to shift the transmission unit 3 into a safeguarded state in the case of an error. For the sake of clarity, the same elements are provided with the same reference numbers as in FIG. 1.

In this configuration, the transmission unit 3 has an energy storage device which is symbolized here by a capacitor 11. For shifting into the definable secured state, the measurement unit 2 is connected to a switch 9 which acts on the connecting line 6. In the normal case, i.e., in the state without errors, the connecting line 6 is closed and the transmission unit 3 supplies power to the measurement unit 2. If an error state is detected, the switch 9 opens the connection between the transmission unit 3 and the measurement unit 2 and connects the capacitor 11 of the transmission unit 3 to ground and discharges it. In this way, on the one hand, electrical energy is withdrawn from the transmission unit 3, and on the other hand, as is shown using FIG. 3, an indication which can be detected outside the transmitter 1, here as an example via a charge monitoring unit 10, arises that there is an error.

The discharge behavior of the capacitor 11 of the transmission unit 3 of FIG. 2, for the normal case, and for the error case, is shown schematically in FIG. 3 in relation to a time characteristic of a voltage U. First of all, as an example for the normal case, as the absence of an error which has been ascertained by the measurement unit, there is conventional behavior of the voltage on a capacitor during charging and discharging. Here, this is followed by a second increase of the voltage, the local peak of the voltage being less than in a first charging process. Likewise, the normal decrease of the voltage, indicated here by the broken line, would take place appropriately to the preceding discharge. That is, the constants for the two discharge processes are essentially identical, and a charge monitoring unit 10 which, for example, is downstream of the transmitter 1 detects nothing conspicuous based on the voltage characteristic.

The solid line corresponds to the case in which there is an error and in which the measurement unit 2 has acted on the connecting line 6 such that the capacitor 11, named as an example, has been discharged to ground. This results in a much steeper discharge behavior.

What is claimed is:

1. A method for monitoring a transmitter having at least one measurement unit, a transmission unit, the measurement unit being interconnected with the transmission unit at least for transmission of signals, and at least one connecting line for supplying power to the measurement unit, comprising the steps of:
   using the measurement unit to determine at least one measurement quantity that is related to at least one of a physical and/or chemical measurement or process quantity and to produce a measurement signal which is dependent on the at least one measurement quantity,
   receiving the measurement signal from the measurement unit by the transmission unit and using the transmission unit for transferring an output signal based on the measurement signal to at least one signal transmission element,
   acting on the at least one connecting line with the measurement unit when the measurement unit detects the presence of an error state, and
   wherein an amount of energy stored in the transmitter is influenced via the acting on the connecting line such that a charging state monitoring unit detects a charging state error.

2. The method in accordance with claim 1, wherein, when the measurement unit detects the presence of an error state, at least one of shifting the transmission unit into a definable state and transferring an error signal to the transmission unit by said acting on the connecting line with the measurement unit.

3. The method in accordance with claim 1, wherein, when the measurement unit detects the absence of an error state, a measurement signal which has been generated by the measurement unit as a result of determining said at least one measurement quantity is transferred to the transmission unit.

4. The method in accordance with claim 1, wherein the measurement unit acts on the connecting line such that an energy value which has been tapped from the measurement unit is outside a definable region.

5. The method in accordance with claim 1, wherein the measurement unit acts on the connecting line in a manner interrupting the connecting line.

6. A transmitter, comprising:
   at least one measurement unit which determines at least one measurement quantity that is related to at least one of a physical and/or chemical measurement or process quantity and produces a measurement signal which is dependent on said at least one measurement quantity,
   a transmission unit interconnected with the measurement unit in a manner at least for receiving the measurement signal from the measurement unit and for transferring an electrical output signal to at least one signal transmission element based on a measurement signal received, and
   at least one connecting line for transmitting energy to the measurement unit,
   wherein the measurement unit is connected so as to act on the connecting line when an error state is found to exist, and
   wherein the measurement unit is adapted for shifting the transmission unit into a definable state and transferring an error signal to the transmission unit via acting on the connecting line, and wherein an amount of energy stored in the transmitter is influenced via the measuring unit acting on the connecting line such that a charging state monitoring unit detects a charging state error.

7. The transmitter in accordance with claim 6, wherein there is at least one switch for opening and closing of the connecting line.

* * * * *